Nov. 14, 1961  P. W. JOHNSON  3,008,240
COMPARATOR GAGE WITH TEST PART ALIGNER
Filed Aug. 20, 1958  2 Sheets-Sheet 2
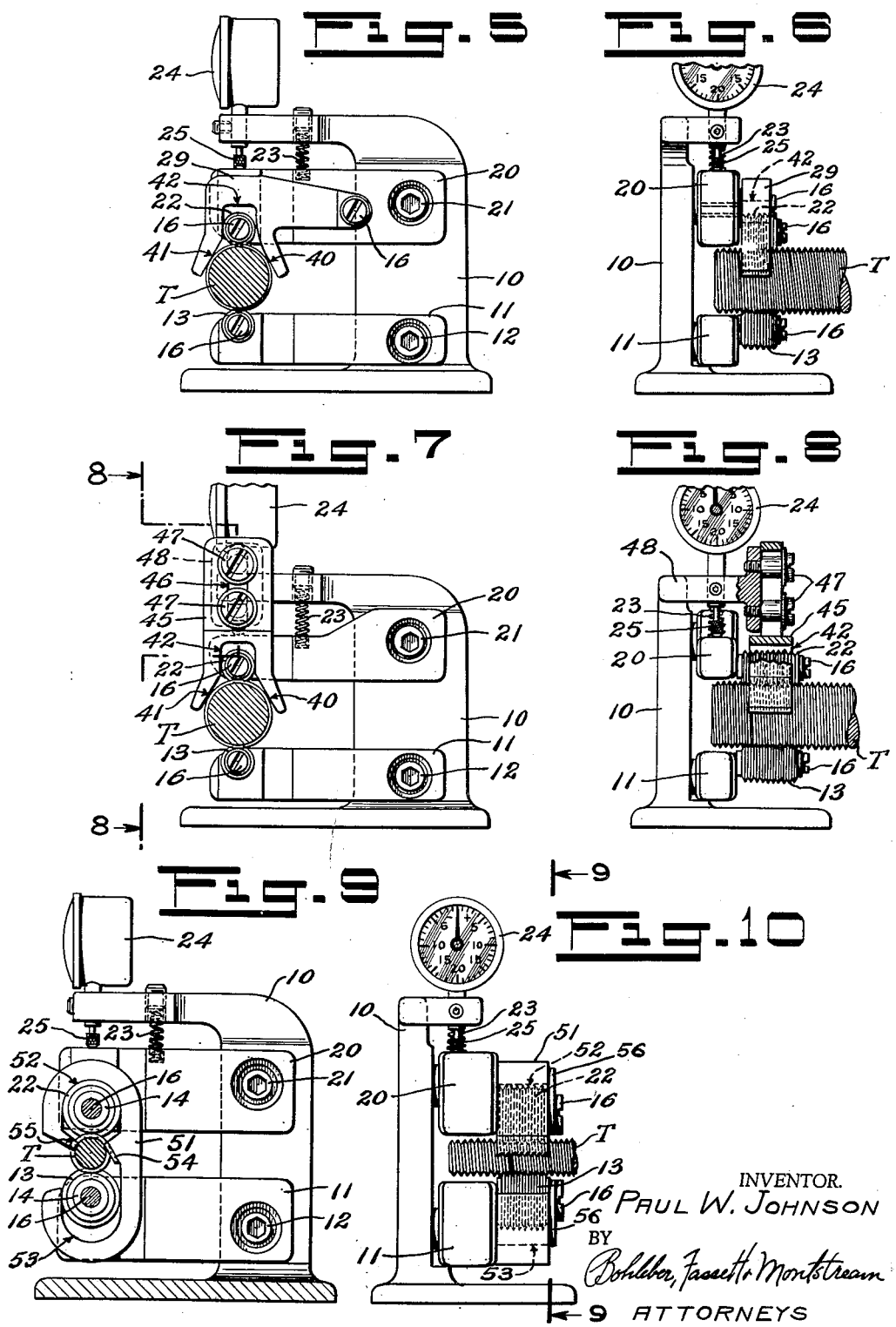
INVENTOR.
PAUL W. JOHNSON
BY
Bohleber, Fassett & Montstream
ATTORNEYS

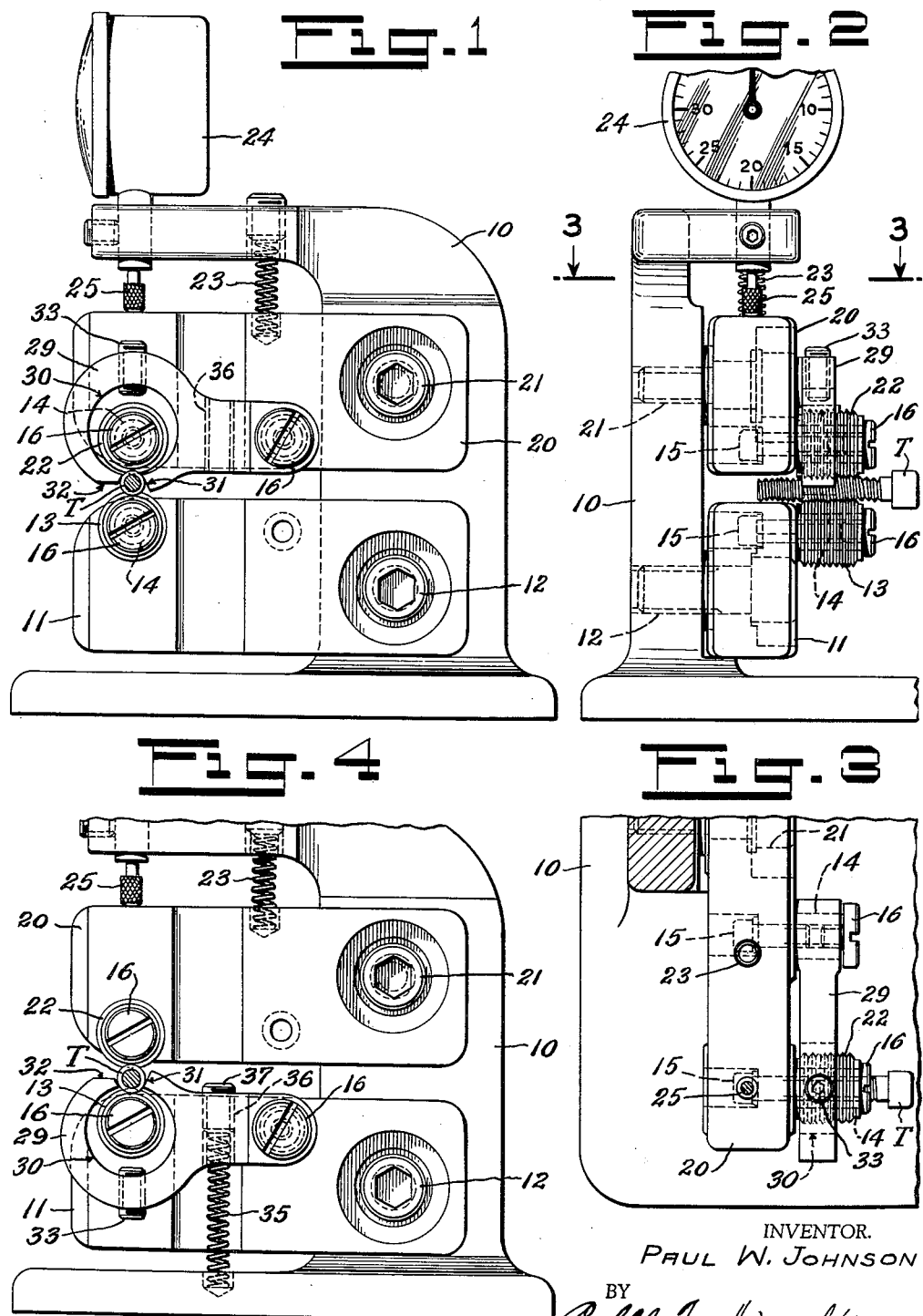

United States Patent Office 3,008,240
Patented Nov. 14, 1961

3,008,240
COMPARATOR GAGE WITH TEST PART ALIGNER
Paul W. Johnson, Bloomfield, Conn., assignor to The Johnson Gage Development Company, Bloomfield, Conn., a corporation of Connecticut
Filed Aug. 20, 1958, Ser. No. 756,257
12 Claims. (Cl. 33—199)

The invention relates to a comparator gage having a test part aligner or aligning cradle. Comparator gages for small diameter test parts usually cannot use a three roll type of gage because the gaging rollers are relatively large and would interfere with each other. In presenting small and very small cylindrical parts including small screw threaded parts to two gaging rolls such as in a comparator type of gage and indeed any gage having a pair of gaging rolls, it is difficult to assure that the axis of the test part is in a plane through the center axes of the gaging rolls and in alignment with the axes of the rolls which is the gaging position for such gages. A test part aligner not only must retain the test part in proper gaging position with respect to the gaging rolls but must not occasion any delay in the gaging operation and should not interfere with the accuracy of the reading secured. In addition a simple device which is inexpensive to manufacture and assemble constitutes an advantageous structure for a test part aligner.

It is an object of the invention to construct a simple test part aligner for use with a comparator gage having two gaging rolls which accurately supports the test part in gaging position.

Another object is to construct a test part aligner having two gaging rolls which engages opposite sides of the test part and is movable towards and away from one of the gaging rolls.

Another object is to construct a test part aligner as above which is inexpensive to manufacture and mount on the gage.

A still further object is as above and in addition provides a test part aligner which does not affect the speed with which a gaging operation may be conducted.

Other objects of the invention will be more apparent from the following description when taken in connection with the accompanying drawings illustrating two embodiments of the invention in which:

FIG. 1 is an enlarged side view of a two roll comparator gage with a pivoted test part aligner carried over the movable gaging roll of the gage with a test part between the gaging rolls;

FIG. 2 is a front view of the gage of FIG. 1 with a test part in gaging position;

FIG. 3 is a partial top view of the gage taken on line 3—3 of FIG. 2;

FIG. 4 is a side elevation of a comparator gage like the gage of FIGS. 1-3 but with the test part aligner mounted with respect to the lower or fixed gaging roll;

FIG. 5 is a side elevation of a gage with a pivoted test part aligner with a test part larger than the gaging rolls;

FIG. 6 is a front elevation of the gage of FIG. 5;

FIG. 7 is a side elevation of a gage with a slidable test part aligner;

FIG. 8 is a front elevation of the gage of FIG. 7 and section taken on line 8—8 of this FIG. 7;

FIG. 9 is a side elevation of a gage as viewed from line 9—9 of FIG. 10 with a slidable test part aligner with the gaging roll means forming a part of the slidable mounting; and FIG. 10 is a front elevation of the gage of FIG. 9.

The gage includes a frame 10 on which is mounted a fixed gaging roll which may be carried by a fixed gaging arm 11. This arm is secured to the frame in any suitable fashion such as by a bolt 12. The arm carries a gaging roll means including a first gaging roll 13 shown particularly as a ridged gaging roll for screw threads which roll is fixed in being mounted on a fixed arm. The gaging roll is rotatably mounted on the arm in any suitable fashion the mounting shown including a stud 14 secured to the arm by a screw 15 and a screw 16 on the end of the stud with an enlarged head so that it engages the end of the gaging roll 13 and retains the roll on the stud.

A comparator gage includes a cooperating gaging means which has a gaging roll means including a second gaging roll mounted for movement towards and away from the first gaging roll. The mounting shown includes a movable frame or particularly a gaging arm 20 which is pivotally mounted on the frame by suitable pivot means such as a pivot screw 21. This arm carries the second gaging roll 22 which is rotatably mounted on the pivoted arm in the same manner as the gaging roll 13. For a screw threaded test part, the roll is a ridged gaging roll shaped to engage the thread. A spring 23 propels the pivoted arm and its movable gaging roll towards the fixed or first gaging roll 13. An indicator of any suitable kind, that illustrated being a dial indicator 24, has its contactor 25 engaging the cooperating gaging means or particularly the arm 20. A test part T inserted between the gaging rolls is gaged as to whether or not it is within permissible tolerances by the extent of deviation of the pointer of the dial indicator from a zero reading which is the reading for a master or perfect thread inserted in the gage.

The test part aligner includes a member around one gaging roll and mounted for movement towards and away from the other gaging roll. The aligner member shown is a lever 29 which is pivotally carried on an adjacent part of the gage such as one of the gaging roll arms and positioned laterally or rearwardly from the gaging rolls. The pivotal mounting illustrated utilizes a stud construction the same as that for the gaging roll and hence similarly numbered. The aligner carries an opening 30 larger than the gaging roll within which the gaging roll 22 is received and is freely movable. Although the aligner is shown as having a width less than that of the gaging roll it of course may have a width greater than, equal to or less than the length of the roll. It, however, should have sufficient width to position and support the test part between the rolls. The aligner has a slot 31 in the edge thereof extending into the opening 30 so that the test part may be inserted and engaged between the gaging rolls. The sides of the slot are inclined and a suitable angle of inclination is 60 degrees overall or 30 degrees for each side of the slot with respect to a plane through the center of or the axes of the gaging rolls. Preferably the forward portion of the aligner has a land 32 for greater ease in inserting the test part between the gaging rolls and to provide a rear side or face of the slot of greater height than the forward side or face of the slot to provide a stop for the insertion of the test part. The aligner may have a stop such as a screw 33 projecting into the opening 30 and positioned to engage the periphery of the gaging roll within the opening. This stop will prevent the aligner from dropping too low, which would make it somewhat more awkward to insert a test part between the gaging rolls without separately manipulating the aligner.

In gaging a test part T, the latter is merely projected against the aligner which raises the same to pass the test part into the slot of the aligner and between the gaging rolls. When the test part reaches the slot 31 the aligner drops by gravity so that the sides of the slot engage the periphery of the test part and by virtue of the angularity of the sides of the slot the test part is centered between the gaging rolls 13 and 22 and holds the same in axial alignment with the axes of the gaging rolls. After the test part has been gaged it is removed by withdrawing the same forwardly which lifts the aligner and permits the test part to be removed.

The aligner may be mounted so as to receive the lower or fixed gaging roll in which case it may be mounted on the fixed arm 11 as shown in FIG. 4. The construction is identical with that of FIG. 1 and similar parts are similarly numbered. With the aligner carried by the lower arm, the weight of the aligner would drop the aligner away from gaging position. When the aligner is carried by the lower gaging roll arm and surrounds the lower gaging roll 13, means are provided to project the aligner towards the other gaging roll. This projecting means may be a compression spring 35 provided between the base of the frame 10 and the aligner with the upper end of the spring being received in a hole 36 in the aligner spaced from the pivot 14. A screw 37 received in the hole abuts the end of the spring which is in the hole 36 and the screw may also be used to adjust the pressure of the spring 35. In this construction the test part is inserted and removed in the same manner that the test part is inserted and removed in the construction of FIGS. 1 through 3.

FIGS. 5 and 6 illustrate a form of construction similar to that of FIG. 1 but utilizing primarily gaging rolls of smaller diameter relatively to the test part T. In this construction the pivoted aligner 29 has a slot formed by angular aligning surfaces or sides 40 and 41 which engage the periphery of the test part and align it between the two gaging rolls 13 and 22. An opening 42 is provided for the gaging roll 22 so that the aligner may move upwardly and downwardly without interference from this gaging roll.

FIGS. 7 and 8 show a form of test part aligner 45 somewhat similar to that of FIGS. 5 and 6 excepting that this aligner is slidably mounted for movement towards and away from the lower gaging roll 13. The aligner has a guide or slide formed by a slot 46 which provides spaced parallel sides and in which is received a pair of screws or bolts 47 carried by a bracket 48. This bracket is secured to the frame 10. The weight of the aligner or gravity normally propels it downwardly into engagement with a test part to align the same with respect to the gaging rolls between the angular aligning surfaces or sides 40, 41 forming an aligning slot extending into the opening 42.

FIGS. 9 and 10 illustrate an aligner 51 which rides on or is guided by a part of each gaging roll means which includes the gaging rolls and their studs and is shown particularly as riding on or being guided by the peripheries of the gaging rolls. An upper opening 52 receives gaging roll 22 and a lower opening 53 receives the lower gaging roll means such as the periphery of the lower gaging roll 13 so that the gaging roll means themselves are parts or elements of the guide or slide means. The openings have parallel sides which are spaced apart to slidably engage the rolls and thereby guide the aligner. In other words, the gaging rolls in their respective openings 52 and 53 support and guide the aligner for relative movement so that the aligner may be raised for insertion of a test part between the gaging rolls and then move downwardly to align the test part. The aligner has an aligning surface 54 engaging one side of the test part T and a second angular aligning surface 55 engaging the front or other side of the test part to align the latter between the pair of gaging rolls. With the peripheries of the gaging rolls serving as elements of the guide means, a washer 56 secured on the end of the stud may be used to retain the aligner on the gaging rolls.

The aligning surfaces of the construction of FIGS. 9 and 10 are shown particularly with teeth formed on the aligning surfaces corresponding with the ridges of a thread gaging roll so that the aligning surfaces actually engage the threads of the test part rather than the periphery in performing its aligning function. These teeth are located with respect to the ridges on the thread gaging roll to engage the thread of the the test part considering the helix of the thread. The aligning surfaces of all of the test part aligners illustrated herein may similarly carry teeth corresponding with the threads of the test part. In some test parts the thread is not on the same center axis as the periphery of the test part and therefore the thread itself provides a more effective engagement in such cases for aligning the test part rather than the outer periphery. The width of the aligning surfaces usually will be the same as the length of the gaging roll although they may be narrower or wider. The wider the aligning surfaces are, the more effective alignment is secured if the test part is long enough to allow for greater width. For gaging rolls having one or two thread gaging ridges for pitch diameter gaging, the aligning surfaces are usually wider than the length of the ridged portion of the gaging rolls. It is clear too that in all forms the aligning means may be mounted adjacent to or with respect to the lower gaging roll and a spring used to press the aligner upwardly in the manner of FIG. 4. For plain surfaced test parts the gaging rolls will be plain cylindrical rolls.

Whether the aligning means or member is pivotally mounted or slidably mounted on the guide means, the test part aligner with its aligning surfaces moves in a direction parallel or substantially parallel to a plane through the center axes of the two gaging rolls. The gaging surfaces are also angularly inclined in opposite directions with respect to this same plane. So constructed, aligning of the test part with respect to two gaging rolls is secured without the aligning function being affected by variations in diameters between different test parts.

This invention is presented to fill a need for improvements in a Comparator Gage With Test Part Aligner. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A comparator gage combination for a test part comprising a frame, a first gaging roll means mounted upon the frame including a first gaging roll; cooperating gaging means comprising a gaging roll frame, a gaging roll means mounted on the gaging roll frame including a second gaging roll, and means mounting the gaging roll frame on the frame with the gaging rolls in spaced adjacent gaging position and for movement of the second gaging roll towards and away from the first gaging roll; the first and second gaging rolls providing the sole gaging rolls, an indicator carried by one of the parts including the frame and the gaging roll frame and the indicator having a contactor engaging the other part; a test part aligner having an opening therein to receive a gaging roll, means movably mounting the test part aligner with a gaging roll received in the opening and for movement towards and away from the other gaging roll, the test part aligner having a slot extending to the opening and located to include a plane extending through the centers of the gaging rolls and the slot having sides forming aligning surfaces extending at equal and opposite angles with respect to the plane and with the narrower part of the slot at the opening, and the sides of the slot being spaced apart a distance to engage a test part received between the gaging rolls and located oppositely to the space between the gaging rolls.

2. A comparator gage combination as in claim 1 in which the mounting means for the test part aligner is a pivot located laterally of the gaging rolls.

3. A comparator gage combination as in claim 2 in which the test part aligner is pivotally mounted on the gaging roll frame.

4. A comparator gage combination as in claim 1 in which the second gaging roll is mounted above the first gaging roll and the test part aligner is pivotally mounted laterally of the first gaging roll with the latter in the opening of the aligner, and means propelling the test part aligner upwardly.

5. A comparator gage combination as in claim 4 in which the propelling means for the test part aligner is a spring.

6. A comparator gage combination as in claim 1 in which the rear side of the slot has a greater height than the forward side.

7. A comparator gage combination as in claim 6 including a stop carried by the test part aligner projecting into the opening oppositely from the slot.

8. A comparator gage combination as in claim 1 in which the mounting means for the test part aligner includes a slide having spaced parallel sides, and means engaging the slide to guide the movement of the test part aligner.

9. A comparator gage combination as in claim 8 in which the means engaging the slide are a pair of spaced bolts carried by the frame.

10. A comparator gage combination as in claim 8 in which the parallel sides of the slide are spaced apart to receive a part of the first gaging roll means, and the slide having parallel sides spaced apart to receive a part of the second gaging roll means.

11. A comparator gage combination as in claim 10 in which the parallel sides of the slides are spaced apart to engage the peripheries of the gaging rolls.

12. A comparator gage combination as in claim 1 in which the gaging rolls have thread engaging ridges and the aligning surfaces of the test part aligner have straight teeth corresponding in pitch with the ridges of the gaging rolls and located to engage the thread of a test part.

References Cited in the file of this patent

UNITED STATES PATENTS

| | | |
|---|---|---|
| 2,224,728 | Gulliksen | Dec. 10, 1940 |
| 2,409,280 | Hohwart | Oct. 15, 1946 |